(12) United States Patent
Wei et al.

(10) Patent No.: US 11,904,302 B2
(45) Date of Patent: *Feb. 20, 2024

(54) BOTTOMS UPGRADING AND LOW COKE FLUID CATALYTIC CRACKING CATALYST

(71) Applicant: BASF CORPORATION, Florham Park, NJ (US)

(72) Inventors: Junmei Wei, Iselin, NJ (US); Lucas Dorazio, Iselin, NJ (US); Karl C. Kharas, Iselin, NJ (US); David J. Camerota, Attapulgus, GA (US); David M. Stockwell, Iselin, NJ (US)

(73) Assignee: BASF CORPORATION, Florham Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,665

(22) Filed: Aug. 30, 2022

(65) Prior Publication Data

US 2023/0048215 A1 Feb. 16, 2023

Related U.S. Application Data

(63) Continuation of application No. 16/613,760, filed as application No. PCT/US2018/032909 on May 16, 2018, now Pat. No. 11,471,862.

(Continued)

(51) Int. Cl.
*B01J 29/08* (2006.01)
*B01J 21/04* (2006.01)
(Continued)

(52) U.S. Cl.
CPC .............. *B01J 29/088* (2013.01); *B01J 21/04* (2013.01); *B01J 21/16* (2013.01); *B01J 23/10* (2013.01);
(Continued)

(58) Field of Classification Search
CPC ... B01J 21/04; B01J 21/16; B01J 23/10; B01J 29/084; B01J 29/088; B01J 35/0006; B01J 35/08; B01J 37/10; B01J 37/30; B01J 2229/186; C10G 11/05; C10G 11/18; C10G 2300/70
See application file for complete search history.

(56) References Cited

U.S. PATENT DOCUMENTS 4,493,902 A 1/1985 Brown et al.
5,194,413 A 3/1993 Kumar
(Continued)

FOREIGN PATENT DOCUMENTS

BR 9304680 A 6/1994
CN 1374928 A 10/2002
(Continued)

OTHER PUBLICATIONS

Wefers, K. et al., 1972, Oxides and Hydroxides of Aluminum, Alcoa Research Labs, East St. Louis, III. [Office action cites table on p. 43] (Year: 1972).*

(Continued)

*Primary Examiner* — Brian A McCaig
(74) *Attorney, Agent, or Firm* — Lowenstein Sandler LLP

(57) ABSTRACT

A microspherical fluid catalytic cracking (FCC) catalyst includes Y zeolite and a gamma-alumina.

16 Claims, 3 Drawing Sheets

Related U.S. Application Data

(60) Provisional application No. 62/507,451, filed on May 17, 2017.

(51) Int. Cl.
  *B01J 21/16* (2006.01)
  *B01J 23/10* (2006.01)
  *B01J 37/10* (2006.01)
  *B01J 37/30* (2006.01)
  *C10G 11/05* (2006.01)
  *C10G 11/18* (2006.01)

(52) U.S. Cl.
  CPC ............... *B01J 35/51* (2024.01); *B01J 37/10* (2013.01); *B01J 37/30* (2013.01); *C10G 11/05* (2013.01); *C10G 11/18* (2013.01); *B01J 2229/186* (2013.01); *C10G 2300/70* (2013.01)

(56) References Cited

U.S. PATENT DOCUMENTS

| | | | |
|---|---|---|---|
| 5,718,879 A * | 2/1998 | Chopin | B01J 23/10 |
| | | | 423/628 |
| 6,656,347 B2 | 12/2003 | Stockwell et al. | |
| 6,680,416 B1 | 1/2004 | Hebgen et al. | |
| 6,942,784 B2 | 9/2005 | Stockwell et al. | |
| 6,977,273 B2 | 12/2005 | Roy-Auberger et al. | |
| 8,278,235 B2 | 10/2012 | Stockwell et al. | |
| 11,471,862 B2 * | 10/2022 | Wei | B01J 35/0006 |
| 2001/0051589 A1 | 12/2001 | Van Berge et al. | |
| 2003/0089640 A1 | 5/2003 | Madon et al. | |
| 2003/0136707 A1 | 7/2003 | Harris et al. | |
| 2004/0235642 A1 | 11/2004 | Xu et al. | |
| 2006/0040823 A1 | 2/2006 | Stockwell | |
| 2008/0139381 A1 | 6/2008 | Lok et al. | |
| 2014/0256543 A1 | 9/2014 | Khosravi-Mardkhe et al. | |
| 2015/0202605 A1 | 7/2015 | Hayashi et al. | |
| 2017/0362513 A1 | 12/2017 | McGuire et al. | |

FOREIGN PATENT DOCUMENTS

| | | |
|---|---|---|
| JP | H10216526 A | 8/1998 |
| JP | H10337475 A | 12/1998 |
| JP | 2005532146 A | 10/2005 |
| JP | 2007533428 A | 11/2007 |
| JP | 2014036934 A | 2/2014 |
| WO | 0112552 A1 | 2/2001 |
| WO | 03054114 A2 | 7/2003 |
| WO | 2008157199 A2 | 12/2008 |
| WO | 2013011517 A1 | 1/2013 |

OTHER PUBLICATIONS

Office Action for JP2019-563545 with English Translation dated Apr. 4, 2022, 15 pages.

Scherzer, J. et al. (1975) The Journal of Physical Chemistry, 79(12), 1194-1199.

Iyer, P.S. et al. (1988) Perspectives in Molecular Sieve Science, ACS Symposium Series, American Chemical Society, Washington, D.C., pp. 48-65.

Tironi, A. etal. (2012) Procedia Materials Science, 1,343-350.

Ferella et al., "Oil refining spent catalysts: A review of possible recycling technologies," Resources, Conservation and Recycling, 2016, pp. 10-20.

International Search Report & Written Opinion in International Application No. PCT/US2018/032909. dated Sep. 27, 2018 (15 pages).

Shu et al., "Effect of Ionic Radius of Rare Earth on USY Zeolite in Fluid Catalytic Cracking Fundamentals and Commercial Application," Topics in Catalysis, 2015, vol. 58. Issues 4-6. pp. 334-342.

Sousa-Aguiar et al. "The role of rare earth elements in zeolites and cracking catalysts," Catalysis Foday. 2013, vols. 218-219, pp. 115-122.

Office Action for Chinese Patent Application No. 201880032721.7, dated Aug. 31, 2023, 9 pages.

* cited by examiner

BOTTOMS UPGRADING AND LOW COKE FLUID CATALYTIC CRACKING CATALYST

CROSS-REFERENCE TO RELATED APPLICATIONS

This application is a Continuation application of U.S. patent application Ser. No. 16/613,760 filed on Nov. 14, 2019, which is a national phase entry under 35 U.S.C. § 371 of International Application No. PCT/US2018/032909, filed on May 16, 2018, which claims the benefit of U.S. Provisional Patent Application No. 62/507,451, filed on May 17, 2017, the contents of which are incorporated herein by reference in their entirety.

FIELD

The present technology is generally related to petroleum refining catalysts. More specifically, the technology is related to microspherical fluid catalytic cracking (FCC) catalysts including a gamma alumina containing matrix, and methods of preparing and using such catalysts.

BACKGROUND

Catalytic cracking is a petroleum refining process that is applied commercially on a very large scale. Catalytic cracking, and particularly fluid catalytic cracking (FCC), is routinely used to convert heavy hydrocarbon feedstocks to lighter products, such as gasoline and distillate range fractions. In FCC processes, a hydrocarbon feedstock is injected into the riser section of a FCC unit, where the feedstock is cracked into lighter, more valuable products upon contacting hot catalyst circulated to the riser-reactor from a catalyst regenerator.

Excessive coke and hydrogen are undesirable in commercial catalytic cracking processes. Even small increases in the yields of these products relative to the yield of gasoline can cause significant practical problems. For example, increases in the amount of coke produced can cause undesirable increases in the heat that is generated by burning off the coke during the highly exothermic regeneration of the catalyst. Conversely, insufficient coke production can also distort the heat balance of the cracking process. In addition, in commercial refineries, expensive compressors are used to handle high volume gases, such as hydrogen. Increases in the volume of hydrogen produced, therefore, can add substantially to the capital expense of the refinery.

Since the 1960s, most commercial fluid catalytic cracking catalysts have contained zeolites as an active component. Such catalysts have taken the form of small particles, called microspheres, containing both an active zeolite component and a non-zeolite component in the form of a high alumina, silica-alumina (aluminosilicate) matrix. The active zeolitic component is incorporated into the microspheres of the catalyst by one of general techniques known in the art, such as those in U.S. Pat. No. 4,482,530, or U.S. Pat. No. 4,493,902.

Fluid cracking catalysts which contain silica-alumina or alumina matrices are termed catalysts with "active matrix." Catalysts of this type can be compared with those containing untreated clay or a large quantity of silica, which are termed "inactive matrix" catalysts.

It is believed that the alumina serves to provide sites for cracking gasoil and resid feeds. While moderate amounts of Lewis acidity are desired, it is believed that the silicon in the $Al_2O_3$ creates an undesired, strong Lewis and Bronsted sites that tend to produce coke. Coke, while needed in order to operate FCC units, is usually produced in larger than optimal amounts in FCC catalysis. Thus, reductions in coke selectivity are desirable. The present inventors discovered that FCC catalysts that include a matrix material that contains gamma alumina, either doped or un-doped with rare earth elements, advantageously resulted in a catalyst that had high bottoms upgrading and low coke yield.

SUMMARY

In one aspect, a microspherical fluid catalytic cracking (FCC) catalyst including Y zeolite and a gamma-alumina is provided. In some embodiments, the gamma-alumina includes a rare earth element or an alkaline earth element. In some embodiments, the catalyst includes Y-zeolite. In some embodiments, the catalyst further includes $\chi$-alumina, $\theta$-alumina, $\delta$-alumina, $\kappa$-alumina, boehmite, or mixtures of two or more thereof. In further embodiments, the catalyst includes amorphous material or kaolin that has been subjected to calcination through an exotherm.

In one aspect, a method of making a zeolitic fluid catalytic cracking catalyst is provided, the method including:
  pre-forming precursor microspheres that include a non-zeolitic material and gamma-alumina, and
  in situ crystallizing a zeolite on the pre-formed microspheres to provide the zeolitic microsphere material.

In some embodiments, Y-zeolite is crystallized on the precursor microspheres.

In one aspect, a method of cracking a hydrocarbon feed is provided, that includes contacting said feed with a FCC catalyst including a microspherical fluid catalytic cracking (FCC) catalyst comprising Y zeolite and gamma-alumina. In some embodiments, the method results in a gasoline yield of greater than 1% gasoline at constant coke, when compared to contacting the feed with a FCC catalyst that does not comprise gamma-alumina. In some embodiments, the method results in 1% lower bottoms at constant coke, when compared to contacting the feed with a FCC catalyst that does not comprise gamma-alumina. In some embodiments, the method results in 10% lower coke at constant bottoms cracking, when compared to contacting the feed with a FCC catalyst that does not comprise gamma-alumina.

In one aspect, a microspherical catalyst including gamma-alumina is provided.

DETAILED DESCRIPTION

Figure 1:
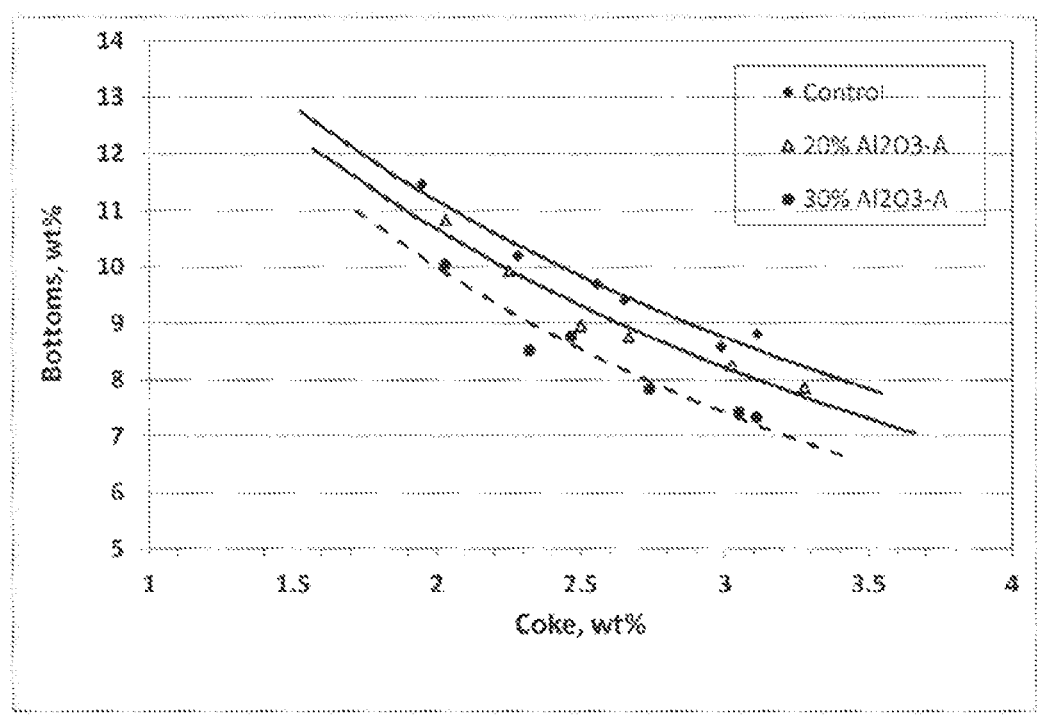
FIG. 1 provides the results from ACE testing of lanthanum doped $Al_2O_3$ containing FCC catalyst samples.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, the term "catalyst" or "catalyst composition" or "catalyst material" refers to a material that promotes a reaction.

As used herein, the term "fluid catalytic cracking" or "FCC" refers to a conversion process in petroleum refineries wherein high-boiling, high-molecular weight hydrocarbon fractions of petroleum crude oils are converted to more valuable gasoline, olefinic gases, and other products.

"Cracking conditions" or "FCC conditions" refers to typical FCC process conditions. Typical FCC processes are conducted at reaction temperatures of 450° to 650° C. with catalyst regeneration temperatures of 600° to 850° C. Hot regenerated catalyst is added to a hydrocarbon feed at the base of a rise reactor. The fluidization of the solid catalyst particles may be promoted with a lift gas. The catalyst vaporizes and superheats the feed to the desired cracking temperature. During the upward passage of the catalyst and feed, the feed is cracked, and coke deposits on the catalyst. The coked catalyst and the cracked products exit the riser and enter a solid-gas separation system. e.g., a series of cyclones, at the top of the reactor vessel. The cracked products are fractionated into a series of products, including gas, gasoline, light gas oil, and heavy cycle gas oil. Some heavier hydrocarbons may be recycled to the reactor.

As used herein, the term "feed" or "feedstock" refers to that portion of crude oil that has a high boiling point and a high molecular weight. In FCC processes, a hydrocarbon feedstock is injected into the riser section of a FCC unit, where the feedstock is cracked into lighter, more valuable products upon contacting hot catalyst circulated to the riser-reactor from a catalyst regenerator.

As used herein, the term "resid" refers to that portion of crude oil that has a high boiling point and a high molecular weight and typically contains contaminant metals including Ni, V, Fe, Na, Ca, and others. The contaminant metals, particularly Ni and V, have detrimental effects on catalyst activity and performance. In some embodiments, in a resid feed operation one of Ni and V metals accumulate on the catalyst, and the FCC catalyst composition is effective to contact nickel and vanadium during cracking.

As used herein, the term "non-zeolitic component" refers to the components of a FCC catalyst that are not zeolites or molecular sieves. As used herein, the non-zeolitic component can comprise binder and filler.

As used herein, the term "zeolite" refers to is a crystalline aluminosilicate with a framework based on an extensive three-dimensional network of oxygen ions and have a substantially uniform pore distribution.

As used herein, the term "intergrown zeolite" refers to a zeolite that is formed by an in situ crystallization process.

As used herein, the term "in sin crystallized" refers to the process in which a zeolite is grown or intergrown directly on/in a microsphere and is intimately associated with the matrix or non-zeolitic material, for example, as described in U.S. Pat. Nos. 4,493,902 and 6,656,347. The zeolite is intergrown within the macropores of the microsphere, such that the zeolite is uniformly dispersed on the matrix or non-zeolitic material. The zeolite is intergrown directly on/in the macropores of the precursor microsphere such that the zeolite is intimately associated and uniformly dispersed on the matrix or non-zeolitic material.

As used herein, the term "incorporated catalyst" refers to a process in which the zeolitic component is crystallized and then incorporated into microspheres in a separate step.

As used herein, the terms "preformed microspheres" or "precursor microspheres" refer to microspheres obtained by spray drying and calcining a non-zeolitic matrix component and a gamma-alumina.

As used herein, the term "zeolite-containing microsphere" refers to a microsphere obtained either by in situ crystallizing a zeolite material on pre-formed precursor microspheres or by microspheres in which the zeolitic component is crystallized separately and then mixed with the precursor microspheres.

In one aspect, a microspherical fluid catalytic cracking (FCC) catalyst includes a Y zeolite and a gamma-alumina. In some embodiments, the catalyst includes about 1 wt % to about 60 wt % of the gamma-alumina. In some embodiments, the catalyst includes about 10 wt % to about 40 wt % of the gamma-alumina. In particular embodiments, the catalyst includes about 30 wt % the gamma-alumina.

In some embodiment described herein, the catalyst may further include $\chi$-alumina, $\delta$-alumina, $\theta$-alumina, $\kappa$-alumina, boehmite, or mixtures of two or more thereof. In particular embodiments, the catalyst may include a mixture of gamma-alumina and one or more of $\chi$-alumina, $\delta$-alumina, $\theta$-alumina, $\kappa$-alumina, and boehmite. In some embodiments, the catalyst may include a mixture of gamma-alumina, $\chi$-alumina, and one or more of $\delta$-alumina, $\theta$-alumina, $\kappa$-alumina, and boehmite.

In one aspect, the gamma-alumina may further include a rare earth element, an alkaline earth element, or a mixture of any two or more such elements. For example, the gamma-alumina may include a rare earth elements. In particular embodiments, the rare earth element may be ytterbium, gadolinium, cerium, lanthanum, or a mixture of any two or more thereof. In particular embodiments, the rare earth element is lanthanum. In some embodiments, the gamma-alumina includes alkaline earth metals. In further embodiments, the alkaline earth metal is at least one of barium, calcium, or magnesium, or a mixture of any two or more thereof. In particular embodiments, the alkaline earth metal is barium. In some embodiments, the rare earth or alkaline earth elements are present in an amount of about 0.1 wt % to about 12 wt %. In some embodiments, the rare earth or alkaline earth elements are present in an amount of about 1 wt % to about 10 wt %. In a particular embodiment, the gamma-alumina includes about 1% to about 5% lanthanum. In a particular embodiment, the gamma-alumina includes about 1% to about 3% lanthanum. In particular embodiments, the gamma-alumina includes about 1% to about 5% barium. In a particular embodiment, the gamma-alumina includes about 1% to about 3% barium.

In some embodiments, the gamma-alumina, χ-alumina, δ-alumina, θ-alumina, κ-alumina, or boehmite may further include a rare earth element, an alkaline earth element, or a mixture of any two or more such elements as described herein in any embodiment. For example, the gamma-alumina, χ-alumina, δ-alumina, θ-alumina, κ-alumina, or boehmite in the catalyst may include a rare earth element, including but not limited to, ytterbium, gadolinium, cerium, lanthanum, or a mixture of any two or more thereof. In particular embodiments, the rare earth element may include lanthanum. In some embodiments, the gamma-alumina, χ-alumina, δ-alumina, θ-alumina, κ-alumina, or boehmite in the catalyst may include an alkaline earth element. In some embodiments, the alkaline earth element may include barium, calcium, magnesium, or a mixture of any two or more thereof. In particular embodiments, the alkaline earth metal includes barium. In particular embodiments, the rare earth elements or alkaline earth elements are present in an amount of about 0.1 wt % to about 12 wt %, about 1 wt % to about 10 wt %, about 1% to about 5 wt %, or about 1 wt % to about 3%.

The FCC catalyst may have a phase composition including at least 10 wt % zeolite. In some embodiments, the FCC catalyst has a phase composition including at least 60 wt % zeolite. The FCC catalyst of the present technology may have a phase composition that includes at least about 30 wt % Y-zeolite. In some embodiments, the catalyst has a phase composition that includes at least about 40 wt % Y-zeolite. In particular embodiments, the catalyst has a phase composition that includes at least about 60 wt % Y-zeolite. In particular embodiments, the catalyst has a phase composition that includes at least about 65 wt % Y-zeolite.

The FCC catalyst of the present technology may further include mullite. In some embodiments, the FCC catalyst may include about 5% to about 40 wt % mullite. In some embodiments, the phase composition further includes at least about 20 wt % mullite.

The FCC catalyst may have a phase composition including zeolite, mullite, and amorphous material. The FCC catalyst may have a phase composition including Y-zeolite, mullite, and amorphous material. In some embodiments, the phase composition further may include at least about 30 wt % amorphous material.

The Y-zeolite may be crystallized as a layer on the surface of a matrix, wherein the matrix comprises gamma-alumina. In some embodiments, the matrix also includes kaolin that has been subjected to calcination through an exotherm. In further embodiments, the matrix includes about 20 wt % to about 60 wt % kaolin that has been subjected to calcination through an exotherm. In particular embodiments, the matrix includes about 30 wt % kaolin that has been subjected to calcination through an exotherm.

In some embodiments, the Y-zeolite of the FCC catalyst may be ion-exchanged to reduce the sodium content of said catalyst to less than 0.5% by weight Na$_2$O. In particular embodiments, the Y-zeolite may be ion-exchanged to reduce the sodium content of said catalyst to less than 0.3% by weight Na$_2$O.

In some embodiments, the Y-zeolite may further include a rare earth element in the range of 0.1% to 12% by weight. In some embodiments, the rare earth element may be lanthanum, cerium, praseodymium, neodymium, or a mixture of any two or more. In particular embodiments, the rare earth element may be lanthanum. In further particular embodiments, the Y-zeolite may be ion-exchanged to include the rare earth element. In some embodiments, the FCC catalyst includes a lanthanum-exchanged zeolite crystallized in-situ in a porous kaolin matrix.

The FCC catalyst may have a matrix that comprises about 30% gamma-alumina, about 30% of kaolin that has been subjected to calcination through its characteristic exotherm, about 40% metakaolin. In some embodiments, the gamma-alumina may be doped with a rare earth element such as lanthanum. In some embodiments, FCC catalyst includes at least about 20% Y-zeolite crystallized in or on the matrix. In some embodiments, the FCC catalyst is ion-exchanged to reduce the sodium content of said catalyst is less than 0.3% by weight Na$_2$O. In some embodiments, the Y-zeolite further includes a rare-earth element such as lanthanum in the range of about 0.1% to about 5% by weight.

In some embodiments, the Y-zeolite has a unit cell parameter of less than or equal to 24.75 Å. In some embodiments, the Y-zeolite has a unit cell parameter of less than or equal to 24.60 Å. In some embodiments, the Y-zeolite has a unit cell parameter of less than or equal to 24.55 Å. In some embodiments, the Y-zeolite has a unit cell parameter of from about 24.10 Å to about 24.70 Å.

The FCC catalyst average particle size may be from about 60 to about 100 micrometers. In some embodiments, the FCC catalyst has an average particle size of about 60 to about 90 micrometers. In some embodiments, the FCC catalyst has an average particle size of about 60 to about 80 micrometers.

In one aspect, a microspherical catalyst comprising gamma-alumina is provided. In one embodiment, the microspherical catalyst includes about 1 wt % to about 80 wt % of the gamma-alumina. In some embodiments, the microspherical catalyst includes about 10 wt % to about 60 wt % or about 10 wt % to about 40 wt % of the gamma-alumina. In particular embodiments, the microspherical catalyst includes about 10 wt % to 70 wt % of the gamma-alumina.

The gamma-alumina in the microspherical catalyst may include a rare earth element. For example, this may include ytterbium, gadolinium, cerium, lanthanum, or a mixture of any two or more thereof. In particular embodiments, the rare earth element may include lanthanum. In some embodiments, the gamma-alumina in the microspherical catalyst may include an alkaline earth element. In some embodiments, the alkaline earth element may include barium, calcium, magnesium, or a mixture of any two or more thereof. In particular embodiments, the alkaline earth metal includes barium. In some embodiments, the gamma-alumina in the microspherical catalyst includes the rare earth element or the alkaline earth element in an amount of about 0.1 wt % to about 12 wt %. In a particular embodiment, the gamma-alumina includes about 1% to about 5% lanthanum. In a particular embodiment, the gamma-alumina includes about 1% to about 3% lanthanum. In particular embodiments, the gamma-alumina includes about 1% to about 5% barium. In a particular embodiment, the gamma-alumina includes about 1% to about 3% barium.

The microspherical catalyst may further include kaolin that has been subjected to calcination through an exotherm. In some embodiments, the microspherical catalyst includes about 20 wt % to about 60 wt % kaolin that has been subjected to calcination through an exotherm. In particular embodiments, the microspherical catalyst includes about 40 wt % kaolin that has been subjected to calcination through an exotherm.

The microspherical catalyst may include at least about 10 wt % Y-zeolite. In particular embodiments, the Y-zeolite is crystallized as a layer on the surface of the microspherical catalyst.

In one aspect, methods of making the FCC catalysts described herein. In general, the active zeolitic component may be incorporated into the microspheres of the catalyst by one of two general techniques. In one technique, the zeolitic component is crystallized and then incorporated into microspheres in a separate step. In the second technique, the in-situ technique, microspheres are first formed and the zeolitic component is then crystallized in the microspheres themselves to provide microspheres containing both zeolitic and non-zeolitic components.

In one aspect, a method of making a zeolitic fluid catalytic cracking catalyst is provided, the method including:
  pre-forming precursor microspheres including a non-zeolitic material and gamma-alumina; and
  in situ crystallizing a zeolite on the pre-formed microspheres to provide the zeolitic microsphere material.
In some embodiments, the in situ crystallizing includes
  mixing the precursor microspheres with sodium silicate, sodium hydroxide, and water to obtain an alkaline slurry; and
  heating the alkaline slurry to a temperature, and for a time, sufficient to crystallize at least about 10 wt % NaY-zeolite in the microspheres.

In some embodiments, the alkaline slurry is heated for a time sufficient to crystallize at least about 30% by weight, Y-zeolite in or on the pre-formed microspheres.

In some embodiments, the precursor microspheres may further include χ-alumina, δ-alumina, θ-alumina, κ-alumina, boehmite or mixtures of two or more thereof. In particular embodiments, the precursor microspheres may include a mixture gamma-alumina and one or more of χ-alumina, δ-alumina, θ-alumina, κ-alumina, and boehmite. In some embodiments, the precursor microspheres may include a mixture of gamma-alumina, χ-alumina, and one or more of δ-alumina, θ-alumina, κ-alumina, and boehmite.

In some embodiments, the zeolitic microspheric material may be isolated or separated from the crystallization liquor after contacting. The isolation may be carried out by commonly used methods such as filtration. In further embodiments, the zeolitic microspheric material may be washed or contacted with water or other suitable liquid to remove residual crystallization liquor.

The method may further include mixing the zeolitic microspheric material with an ammonium solution prior to or subsequent to contacting with the crystallization liquor, wherein the zeolitic microspheric material includes Y-zeolite in the sodium form prior to the mixing with the ammonium solution. In some embodiments, the mixing with the ammonium solution is conducted at acidic pH conditions. In some embodiments, the mixing with the ammonium solution is conducted at pH of about 3 to about 3.5. In some embodiments, the mixing with the ammonium solution is conducted at a temperature above room temperature. In some embodiments, the mixing with the ammonium solution is conducted at a temperature of at least about 80° C. to about 100° C., including increments therein.

In some embodiments, the ammonium exchanged microspheric material is further ion exchanged with a rare earth ion solution. In some embodiments, the rare earth ion are nitrates of lanthanum, cerium, praseodymium, neodymium, or a mixture of any two or more such nitrates. In some embodiments, the microspheres are contacted with solutions of lanthanum nitrate. In one or more embodiments, the ion exchange step or steps are carried out so that the resulting catalyst contains less than about 0.3%, by weight $Na_2O$. After ion exchange, the microspheres are dried. Rare earth levels in the range of 0.1% to 12% by weight, specifically 1-5% by weight, and more specifically 2-3% by weight are contemplated. In certain embodiments, the amount of rare earth added to the catalyst as a rare earth oxide will range from about 1 to 5%, typically 2-3 wt % rare earth oxide (REO).

In some embodiments, the FCC catalyst is further calcined. In some embodiments, the calcining is conducted for at least about two hours. Such calcining may be conducted at a temperature of from about 500° C. to about 750° C. In some embodiments, the calcining is conducted in the presence of about 25% v/v steam.

The method may further include steam-treating the FCC catalyst. In some embodiments, the steam-treating conducted at a temperature of at least about 700° C. In some embodiments, the steam-treating is conducted for at least about four hours. In some embodiments, the steam-treating is conducted for about one to about 24 hours.

In another aspect, disclosed herein are microspherical FCC catalysts as prepared by any of the methods disclosed herein.

The zeolite may be incorporated into an amorphous binder that includes gamma-alumina. In some embodiments, a slurry containing zeolite, gamma-alumina, and one or more binders is made and spray-dried to yield microspheres whose average particle size is from about 60 to about 100 micrometers. In some embodiments, the slurry further contains clay.

Alternatively, the Y-zeolite may be produced into high zeolite content microspheres by the in-situ procedure described in U.S. Pat. No. 4,493,902 ("the '902 patent"). The '902 patent discloses FCC catalysts including attrition-resistant, high zeolitic content, catalytically active microspheres containing more than about 40%, preferably 50-70% by weight Y faujasite and methods for making such catalysts by crystallizing more than about 40% sodium Y-zeolite in porous microspheres composed of a mixture of metakaolin (kaolin calcined to undergo a strong endothermic reaction associated with dehydroxylation) and kaolin calcined under conditions more severe than those used to convert kaolin to metakaolin, i.e., kaolin calcined to undergo the characteristic kaolin exothermic reaction, sometimes referred to as the spinel form of calcined kaolin. The microspheres containing the two forms of calcined kaolin could also be immersed in an alkaline sodium silicate solution, which is heated, preferably until the maximum obtainable amount of Y faujasite is crystallized in the microspheres. The microspheres are separated from the sodium silicate mother liquor, ion-exchanged with rare earth, ammonium ions or both to form rare earth or various known stabilized forms of catalysts.

The Y-zeolite may also be produced as zeolite microspheres, which are disclosed in U.S. Pat. No. 6,656,347 ("the '347 patent") and U.S. Pat. No. 6,942,784 ("the '784 patent"). These zeolite microspheres are macroporous, have sufficient levels of zeolite to be very active and are of a unique morphology to achieve effective conversion of hydrocarbons to cracked gasoline products with improved bottoms cracking under short contact time FCC processing. These zeolite microspheres are produced by a modification of technology described in the '902 patent.

Methods of Use

Without being bound by theory, it is believed that FCC catalysts containing gamma-alumina may demonstrate improvements in bottoms selectivity. "Bottoms" refers to the heaviest fraction of cracked gasoil, also known as heavy cycle oil (HCO), and has very little value. LCO (light cycle oil) is much more valuable since, with further refining, LCO is transformed into diesel fuel. Catalysts that maximize LCO/bottoms ratio as a function of conversion (conversion in FCC is typically defined as 100-LCO-bottoms) are therefore desired.

In another aspect, methods to produce gasoline in an FCC system are provided, where the methods include using an FCC catalyst as described herein.

In another aspect, methods to improve gasoline yield in an FCC system are provided, where the methods include using an FCC catalyst as described herein.

In another aspect, methods to improve gasoline selectivity in an FCC system are provided, wherein the methods include using an FCC catalyst as described herein.

Without being bound by theory, it is believed that use of the FCC catalysts according to the present technology can yield improved selectivities in the FCC process, such as lower coke yield, more olefinic liquids and LPG, and higher ratio of LCO/bottoms.

Thus, in one aspect, provided is a method of cracking a hydrocarbon feed by contacting said feed with a FCC catalyst that includes a microspherical fluid catalytic cracking (FCC) catalyst comprising Y zeolite and gamma-alumina.

In some embodiments, the microspherical FCC catalyst may further include χ-alumina, δ-alumina, θ-alumina, κ-alumina, boehmite or mixtures of two or more thereof. In particular embodiments, the microspherical FCC catalyst may include a mixture gamma-alumina and one or more of χ-alumina, δ-alumina, θ-alumina, κ-alumina, or boehmite. In some embodiments, the microspherical FCC catalyst may include a mixture of gamma-alumina, χ-alumina, and one or more of δ-alumina, θ-alumina, κ-alumina, or boehmite.

In one embodiments, the present method results in a gasoline yield of greater than 1% gasoline at constant coke, when compared to contacting the feed with a FCC catalyst that does not comprise gamma-alumina.

In one embodiment, the method results in 1% lower bottoms at constant coke, when compared to contacting the feed with a FCC catalyst that does not comprise gamma-alumina.

In one embodiment, the method results in 10% lower coke at constant bottoms cracking, when compared to contacting the feed with a FCC catalyst that does not comprise gamma-alumina.

The present invention, thus generally described, will be understood more readily by reference to the following examples, which are provided by way of illustration and are not intended to be limiting of the present invention.

EXAMPLES

Example 1: Preparation of gamma-alumina containing microspheres. A microsphere is prepared using the following exemplary conditions. The slurry for spray dried microspheres is formed by mixing two component slurry in a Cowles mixer. For example, a slurry containing 40% metakaolin, 0-60% clay calcined beyond 1050° C. and up to 60% gamma-$Al_2O_3$ was spray dried to obtain microspheres. The microsphere is calcined at 1500° F. for 2 hours before crystallization. The microsphere is crystalized for 8-16 hours to form a zeolite Y by the conventional procedures.

Lanthanum-doped γ-$Al_2O_3$-A containing microspheres were prepared according to the procedure described above. The proportions used in the microspheres are shown in Table 1 below.

TABLE 1

Microsphere formulation of $Al_2O_3$ containing microspheres

|  | Control | 20% $Al_2O_3$-A | 30% $Al_2O_3$-A |
|---|---|---|---|
| hydrous (Kaolin), % | 40% | 0% | 0% |
| Meta-Kaolin |  | 40% | 40% |
| Calcined clay | 60% | 40% | 30% |
| $Al_2O_3$-A |  | 20% | 30% |

The samples were then subjected to the in situ procedure to prepare the FCC catalysts according to conventional procedures. Samples were analyzed and properties of the prepared catalysts are summarized in Table 2 below. NaY indicates samples at the sodium Y-zeolite intermediate, "final product" indicates samples after sodium exchange and calcination. HgPV provides the mercury pore volume in cc/g, TSA provides the total surface area in $m^2/g$, MSA provides the matrix surface area in $m^2/g$, ZSA provides the zeolite surface area in $m^2/g$, and SUCS provides the steamed unit cell size in angstroms (Å). The BET method provides a measurement of the specific surface area in $m^2/g$. REO provides the percentage of rare earth oxide. As seen in Table 2, the total porosity of La-doped γ-$Al_2O_3$ containing samples at NaY form is very similar to control.

TABLE 2

Properties of La-doped γ-$Al_2O_3$ containing samples

|  | Control | 20% $Al_2O_3$-A | 30% $Al_2O_3$-A |
|---|---|---|---|
| NaY | | | |
| HgPV (40-20K) ml/g | 0.269 | 0.299 | 0.292 |
| Total surface area | 525 | 509 | 491 |
| matrix surface area | 83 | 77 | 81 |
| zeolite surface area | 442 | 432 | 410 |
| Final product | | | |
| % $Na_2O$ | 0.19 | 0.14 | 0.18 |
| % REO | 3.18 | 3.54 | 3.61 |
| HgPV (40-20K) ml/g | 0.318 | 0.334 | 0.339 |
| steamed | | | |
| Total surface area | 275 | 272 | 263 |
| matrix surface area | 73 | 79 | 82 |
| zeolite surface area | 201 | 194 | 181 |
| HgPV (40-20K) ml/g | 0.366 | 0.395 | 0.385 |
| SUCS | 24.346 | 24.349 | 24.346 |

The samples were tested in an Advanced Catalytic Evaluation (ACE) micro-scale reactor. The rare earth content of final products of La-doped γ-$Al_2O_3$ containing samples is slightly higher than control, as would be expected, because the matrix contains $La_2O_3$ in addition to La-exchanged zeolite. Without being bound by theory, it is believed that the rare earth level on zeolite should be very similar to control, as seen by the very similar unit cell size (UCS) of all of the steamed samples. As seen in FIG. 1, in ACE testing of these samples, bottoms conversion increases with increasing alumina addition, with the 30% gamma-alumina containing sample exhibiting 15% lower bottoms at 3% coke. The same sample also yielded 20.5% lower coke at 92.5% bottoms conversion.

Without being bound by theory, it is believed that the gamma-alumina provides a more favorable matrix activity and pore structure that improves bottoms upgrading without increasing coke yield compared to conventional clay-based matrixes.

Sample containing 30% La-doped gamma-alumina containing microsphere was scaled up in a pilot plant and tested in a circulating riser unit (CRU).

Properties of the scaled-up samples are shown in Table 3 below.

TABLE 3

Properties of scaled-up samples

|  | Control | 30% Al$_2$O$_3$-A |
|---|---|---|
| NaY | | |
| HGPV (40-20K dia) ml/g | 0.34 | 0.25 |
| total surface area | 496 | 465 |
| matrix surface area | 84 | 74 |
| zeolite surface area | 412 | 391 |
| Final product | | |
| REO | 3.22 | 3.44 |
| HGPV (40-20K dia) ml/g | 0.38 | 0.3 |
| total surface area | 371 | 388 |
| matrix surface area | 274 | 274 |
| zeolite surface area | 97 | 114 |
| Steamed | | |
| total surface area | 231 | 202 |
| matrix surface area | 68 | 75 |
| zeolite surface area | 163 | 127 |
| SUCS | 24.330 | 24.307 |

In CRU testing, FCC catalysts that included 30% La-doped gamma-alumina showed 8.6% lower coke at constant bottoms and 0.9% higher gasoline yield at constant coke.

The FCC catalysts containing 30% La-doped gamma-alumina showed lower coke at constant bottoms and higher gasoline yield at constant coke compared with pilot plant control.

Figure 2A:
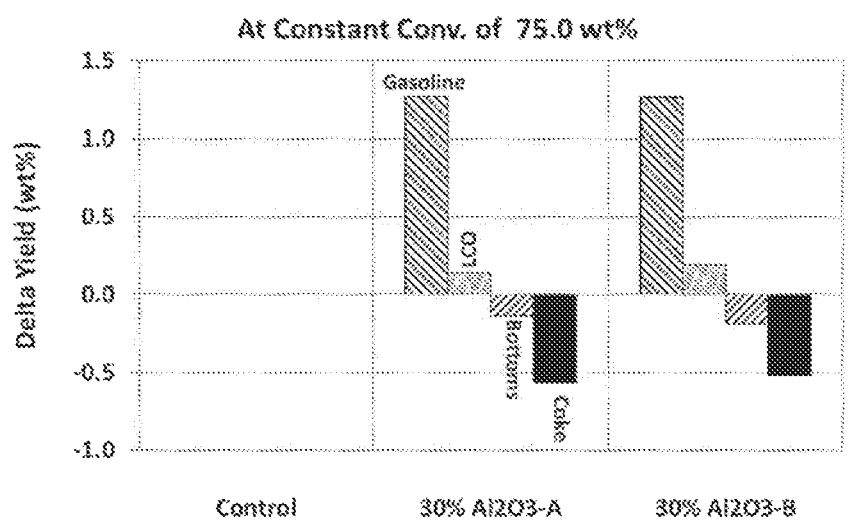
FIGS. 2A-2B provide the results from CRU testing of two different lanthanum doped $Al_2O_3$ containing FCC catalyst samples.
Figure 2B:
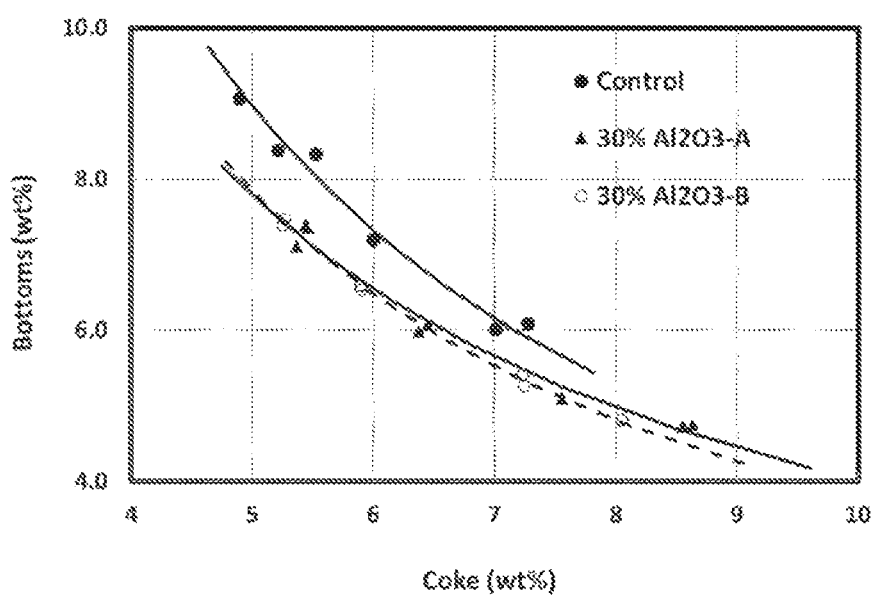

In addition to the catalysts prepared in the above examples, samples containing different type of gamma-alumina (Al$_2$O$_3$-B) were also prepared and tested in a CRU. As seen in FIGS. 2A-2B, Al$_2$O$_3$-B also exhibited gasoline and coke benefit. As seen in FIGS. 2A-2B, FCC catalysts containing La doped gamma-Al$_2$O$_3$ showed 12% lower coke at 75% conversion. Without being bound by theory, it is believed that the increased matrix acidity of the La doped gamma-Al$_2$O$_3$ improved bottoms upgrading. Al$_2$O$_3$ containing sample also exhibited increased mesoporosity, which is believed to result in improved gasoline yield.

Sample containing 50% La-doped alumina (Al$_2$O$_3$-C, mixture of γ-Al$_2$O$_3$ and χ-Al$_2$O$_3$) and 13% crystalline boehmite (Al$_2$O$_3$-D) microsphere was scaled up in a pilot plant and tested in a circulating riser unit (CRU). A different clay based control was also tested in CRU.

Properties of the scaled-up samples are shown in Table 4 below.

TABLE 4

Properties of scaled-up samples

|  | Control | 50% Al$_2$O$_3$-C |
|---|---|---|
| Final Product | | |
| REO | 2.11 | 2.22 |

TABLE 4-continued

Properties of scaled-up samples

|  | Control | 50% Al$_2$O$_3$-C |
|---|---|---|
| TSA | 342 | 299 |
| MSA | 121 | 96 |
| ZSA | 221 | 203 |
| Z/M | 1.82 | 2.11 |
| Steamed | | |
| STSA | 217 | 180 |
| SMSA | 102 | 69 |
| SZSA | 114 | 111 |
| SZSA/SMSA | 1.12 | 1.61 |

Figure 3A:
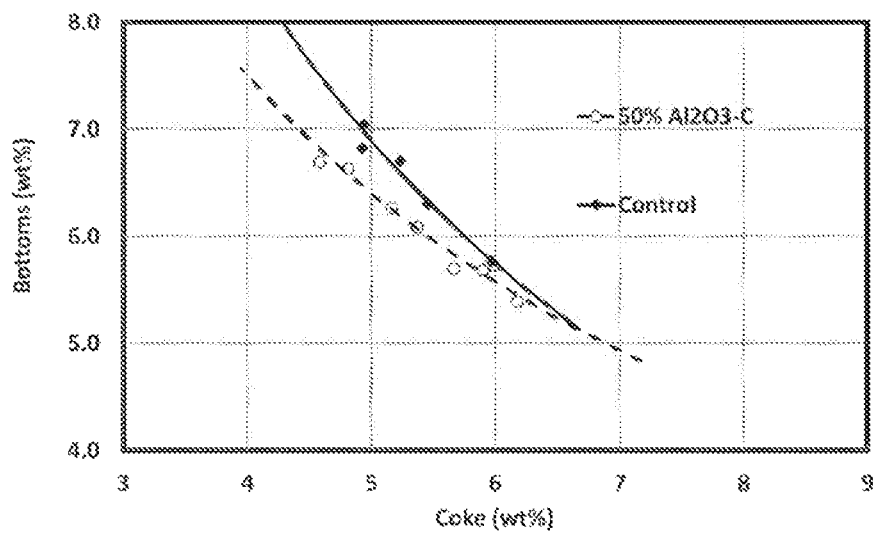
FIGS. 3A-3B provide the results from CRU testing of lanthanum doped gamma-$Al_2O_3$ and $\chi$-$Al_2O_3$ mixture and crystalline boehmite containing FCC catalyst samples.
Figure 3B:
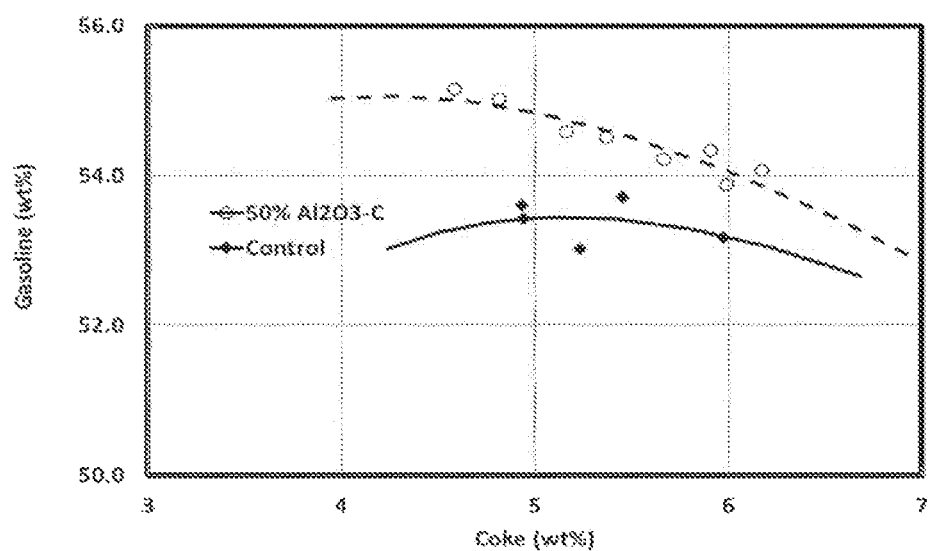

As seen in FIGS. 3A and 3B, in CRU testing, FCC catalysts that included 50% La-doped γ-Al$_2$O$_3$, and χ-Al$_2$O$_3$ mixture and 13% crystalline boehmite showed lower coke at constant bottoms and higher gasoline yield at constant coke compared with a clay based control.

Para. A. A catalyst comprising Y zeolite and a gamma-alumina, wherein the catalyst is a microspherical fluid catalytic cracking (FCC) catalyst.

Para. B. The catalyst of Para. A, comprising about 1 wt % to about 80 wt % of the gamma-alumina.

Para. C. The catalyst of Paras. A or B, comprising about 10 wt % to about 40 wt % of the gamma-alumina.

Para. D. The catalyst of Paras. A-C, wherein the catalyst further comprises χ-alumina, δ-alumina, θ-alumina, κ-alumina, boehmite, or mixtures of two or more thereof.

Para E. The catalyst of any one of Paras A-D, wherein the gamma-alumina further comprises a rare earth element.

Para. F. The catalyst of Para. E, wherein the rare earth element comprises ytterbium, gadolinium, cerium, lanthanum, or a mixture of any two or more thereof.

Para. G. The catalyst of Para. F, wherein the rare earth element comprises lanthanum.

Para. H. The catalyst of any one of Paras. A-G, wherein the gamma-alumina further comprises an alkaline earth element.

Para. I. The catalyst of Para. H, wherein the alkaline earth element comprises barium, calcium, magnesium, or a mixture of any two or more thereof.

Para. J. The catalyst of Para. I, wherein the alkaline earth metal comprises barium.

Para. K. The catalyst of any one of Paras. E-J, wherein the alumina comprises the rare earth element or the alkaline earth element in an amount of about 0.1 wt % to about 12 wt %.

Para. L. The catalyst of any one of Paras. E-K, wherein the alumina comprises the rare earth element or the alkaline earth element in an amount of about 1 wt % to about 10 wt %.

Para. M. The catalyst of any one of Paras. A-L, wherein the catalyst has a phase composition comprising at least about 10 wt % Y-zeolite.

Para. N. The catalyst of any one of Paras. A-L, wherein the catalyst has a phase composition comprising at least about 30 wt % Y-zeolite.

Para. O. The catalyst of any one of Paras. A-L, wherein the catalyst has a phase composition comprising at least about 60 wt % Y-zeolite.

Para. P. The catalyst of any one of Paras. A-O, wherein the phase composition further comprises at least about 30 wt % amorphous material.

Para. Q. The catalyst of any one of Paras. A-P, wherein the Y-zeolite is crystallized as a layer on the surface of a matrix, wherein the matrix comprises gamma-alumina.

Para. R. The catalyst of Para. Q, wherein the matrix comprises kaolin that has been subjected to calcination through an exotherm.

Para. S The catalyst of Para. R, wherein the matrix comprises about 20 wt % to about 60 wt % kaolin that has been subjected to calcination through an exotherm.

Para. T. The catalyst of Paras. R or S, wherein the matrix comprises about 10 wt % kaolin that has been subjected to calcination through an exotherm.

Para. U. The catalyst of any one of Paras A-T, wherein the Y-zeolite is ion-exchanged to reduce the sodium content of said catalyst to less than 0.7% by weight $Na_2O$.

Para. V. The catalyst of any one of Paras. A-T, wherein the Y-zeolite is ion-exchanged to reduce the sodium content of said catalyst to less than 0.5% by weight $Na_2O$.

Para. W. The catalyst of any one of Paras. M-V, wherein the Y-zeolite further comprises a rare earth element in the range of 0.1% to 12% by weight.

Para. X. The catalyst of Para. W, wherein the rare earth element is lanthanum, cerium, praseodymium, neodymium, or a mixture of any two or more.

Para. Y. The catalyst of any one of Paras. M-X, wherein the Y-zeolite is ion-exchanged to include the rare earth element.

Para. Z. A method of making a zeolitic fluid catalytic cracking catalyst, the method comprising:

pre-forming precursor microspheres comprising a non-zeolitic material and gamma-alumina; and in situ crystallizing a zeolite on the pre-formed microspheres to provide the zeolitic microsphere material.

Para. AA. The method of Para. Z, wherein the in situ crystallizing comprises:

mixing the precursor microspheres with sodium silicate, sodium hydroxide, and water to obtain an alkaline slurry; and heating the alkaline slurry to a temperature, and for a time, sufficient to crystallize at least about 15 wt % NaY-zeolite in the microspheres.

Para. AB. The method of Paras. Z or AA, wherein at least 40% by weight Y-zeolite is crystallized in or on the pre-formed microspheres.

Para AC The method of any one of Paras Z-AB, wherein the precursor microspheres further comprise χ-alumina, δ-alumina, θ-alumina, χ-alumina, boehmite, or mixtures of two or more thereof Para. AD. The method of any one of Paras. Z-AC, further comprising.

separating the zeolitic microspheric material from at least a major portion of alkaline slurry;

exchanging sodium cations in the zeolitic microspheric material with ammonium ions or ammonium ions, and thereafter rare earth ions;

Para. AE. The method of any one of Paras. Z-AD, further comprising:

calcining the zeolitic microspheric material;

further exchanging the zeolitic microspheric material with ammonium ions such that the $Na_2O$ content is reduced to below 0.2%; and further calcining the zeolitic microspheric material.

Para. AF. The method of Para. AE, wherein each calcining is independently conducted for at least about two hours at a temperature of from about 500° C. to about 750° C.

Para. AG. The method of Paras. AE or AF, wherein the calcining is conducted in the presence of about 25% v/v steam Para. AH. A microspherical FCC catalyst as prepared by the method of any one of Paras. Z-AG.

Para. AI. A method of cracking a hydrocarbon feed comprising contacting said feed with a FCC catalyst comprising:

microspherical fluid catalytic cracking (FCC) catalyst comprising Y zeolite and gamma-alumina.

Para. AJ. The method of Para. AI, wherein the microspherical FCC catalyst further comprises χ-alumina, δ-alumina, θ-alumina, κ-alumina, boehmite, or mixtures of two or more thereof.

Para. AK. The method according to Paras. AI or AJ, wherein the method results in a gasoline yield of greater than 1% gasoline at constant coke, when compared to contacting the feed with a FCC catalyst that does not comprise gamma-alumina.

Para. AL. The method according to Paras. AI or AJ, wherein the method results in 10% lower bottoms at constant coke, when compared to contacting the feed with a FCC catalyst that does not comprise gamma-alumina.

Para. AM. The method according to Paras. AI or AJ, wherein the method results in 10% lower coke at constant bottoms cracking, when compared to contacting the feed with a FCC catalyst that does not comprise gamma-alumina.

Para. AN. A microspherical catalyst comprising gamma-alumina.

Para. AO. The microspherical catalyst of Para AN, wherein the catalyst further comprises χ-alumina, δ-alumina, θ-alumina, κ-alumina, boehmite, or mixtures of two or more thereof Para. AP. The microspherical catalyst of Paras. AN or AO, comprising about 1 wt % to about 80 wt % of the gamma-alumina.

Para. AQ. The microspherical catalyst of any one of Paras. AN-AP, comprising about 10 wt % to about 40 wt % of the gamma-alumina.

Para. AR. The microspherical catalyst of any one of Paras. AN-AQ, wherein the gamma-alumina further comprises a rare earth element.

Para. AS. The microspherical catalyst of Para. AR, wherein the rare earth element comprises ytterbium, gadolinium, cerium, lanthanum, or a mixture of any two or more thereof.

Para. AT. The microspherical catalyst of Para. AS, wherein the rare earth element comprises lanthanum.

Para. AU. The microspherical catalyst of any one of Paras. AN-AT, wherein the gamma-alumina further comprises an alkaline earth element.

Para AV. The microspherical catalyst of Para. AU, wherein the alkaline earth element comprises barium, calcium, magnesium, or a mixture of any two or more thereof.

Para. AW. The microspherical catalyst of Para. AV, wherein the alkaline earth metal comprises barium.

Para. AX. The microspherical catalyst of any one of Paras. AR-AW, wherein the alumina comprises the rare earth element or the alkaline earth element in an amount of about 0.1 wt % to about 12 wt %.

Para. AY. The microspherical catalyst of any one of Paras. AR-AX, wherein the alumina comprises the rare earth element or the alkaline earth element in an amount of about 1 wt % to about 10 wt %.

Para. AZ. The microspherical catalyst of any one of Paras. AN-AY, further comprising kaolin that has been subjected to calcination through an exotherm.

Para. BA. The microspherical catalyst of Para. AZ., wherein the matrix comprises about 20 wt % to about 60 wt % kaolin that has been subjected to calcination through an exotherm.

Para. BB. The microspherical catalyst of Paras. AZ or BA, wherein the matrix comprises about 40 wt % kaolin that has been subjected to calcination through an exotherm.

Para. BC. The microspherical catalyst of any one of Paras. AN-BB, further comprising at least about 60 wt % Y-zeolite.

Para. BD. The microspherical catalyst of Para. BC, wherein the Y-zeolite is crystallized as a layer on the surface of the microspherical catalyst.

The present invention, thus generally described, will be understood more readily by reference to the following examples, which are provided by way of illustration and are not intended to be limiting of the present invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least." "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present technology may include, but is not limited to, the features and combinations of features recited in the following lettered paragraphs, it being understood that the following paragraphs should not be interpreted as limiting the scope of the claims as appended hereto or mandating that all such features must necessarily be included in such claims:

Other embodiments are set forth in the following claims.

What is claimed is:

1. A catalyst comprising:
  a lanthanum-exchanged Y zeolite; and
  a gamma-alumina matrix, wherein the gamma-alumina matrix is derived from precursor microspheres comprising gamma-alumina and mixed with sodium silicate, wherein the gamma-alumina matrix comprises about 1 wt % to about 5 wt % lanthanum and
  wherein the catalyst is a microspherical fluid catalytic cracking (FCC) catalyst.

2. The catalyst of claim 1, comprising about 1 wt % to about 80 wt % of the gamma-alumina.

3. The catalyst of claim 1, wherein the catalyst further comprises χ-alumina, δ-alumina, θ-alumina, κ-alumina, boehmite, or mixtures of two or more thereof.

4. The catalyst of claim 1, wherein the gamma-alumina matrix further comprises an alkaline earth element.

5. The catalyst of claim 4, wherein the alkaline earth element comprises barium, calcium, magnesium, or a mixture of any two or more thereof.

6. The catalyst of claim 1, wherein the gamma-alumina matrix comprises an alkaline earth element in an amount of about 0.1 wt % to about 12 wt %.

7. The catalyst of claim 1, wherein the catalyst has a phase composition comprising at least about 10 wt % Y-zeolite.

8. The catalyst of claim 7, wherein the phase composition further comprises at least about 30 wt % amorphous material.

9. The catalyst of claim 1, wherein the Y-zeolite is crystallized as a layer on the surface of a matrix, wherein the matrix comprises gamma-alumina.

10. The catalyst of claim 9, wherein the matrix comprises kaolin that has been subjected to calcination through an exotherm.

11. The catalyst of claim 10, wherein the matrix comprises about 20 wt % to about 60 wt % kaolin that has been subjected to calcination through an exotherm.

12. A method of cracking a hydrocarbon feed comprising contacting the feed with a FCC catalyst comprising:

microspherical fluid catalytic cracking (FCC) catalyst comprising a lanthanum-exchanged Y-zeolite and gamma-alumina matrix, wherein the gamma-alumina matrix is derived from precursor microspheres comprising gamma-alumina and mixed with sodium silicate, and wherein the gamma-alumina matrix comprises about 1 wt % to about 5 wt % lanthanum.

13. The method of claim 12, wherein the microspherical FCC catalyst further comprises χ-alumina, δ-alumina, θ-alumina, κ-alumina, boehmite, or mixtures of two or more thereof.

14. The method of claim 12, wherein the method results in a gasoline yield of greater than 1% gasoline at constant coke, when compared to contacting the feed with a FCC catalyst that does not comprise gamma-alumina.

15. The method of claim 12, wherein the method results in 1% lower bottoms at constant coke, when compared to contacting the feed with a FCC catalyst that does not comprise gamma-alumina.

16. The method of claim 12, wherein the method results in 10% lower coke at constant bottoms cracking, when compared to contacting the feed with a FCC catalyst that does not comprise gamma-alumina.

* * * * *